United States Patent [19]
Blackner

[11] Patent Number: 6,094,907
[45] Date of Patent: Aug. 1, 2000

[54] JET ENGINE AND METHOD FOR REDUCING JET ENGINE NOISE BY REDUCING NACELLE BOUNDARY LAYER THICKNESS

[75] Inventor: Anthony M. Blackner, Kirkland, Wash.

[73] Assignee: The Boeing Company, Seattle, Wash.

[21] Appl. No.: 08/658,663

[22] Filed: Jun. 5, 1996

[51] Int. Cl.[7] .................................................. F02K 3/02
[52] U.S. Cl. ........................ 60/226.1; 244/130; 244/208; 181/213
[58] Field of Search .................................. 60/226.7, 271, 60/226.1; 244/130, 208, 209; 181/213

[56] References Cited

U.S. PATENT DOCUMENTS

| | | | |
|---|---|---|---|
| 3,095,696 | 7/1963 | Rumble . | |
| 3,371,743 | 3/1968 | Chanaud et al. | 181/213 |
| 3,820,628 | 6/1974 | Hanson | 181/220 |
| 4,171,785 | 10/1979 | Isenberg | 244/123 |
| 4,258,889 | 3/1981 | Hunt | 244/207 |
| 4,296,899 | 10/1981 | Isenberg | 244/207 |
| 4,799,633 | 1/1989 | Laahti et al. | 244/130 |
| 4,993,663 | 2/1991 | Lahti et al. | 244/53 |
| 5,060,471 | 10/1991 | Torkelson | 181/213 |
| 5,222,698 | 6/1993 | Nelson et al. | 244/130 |
| 5,297,765 | 3/1994 | Hughes et al. | 244/209 |
| 5,368,258 | 11/1994 | Johnson et al. | 244/130 |
| 5,417,391 | 5/1995 | Savitsky et al. | 244/208 |
| 5,590,520 | 1/1997 | Papamoschou | 181/213 |

FOREIGN PATENT DOCUMENTS

| | | | |
|---|---|---|---|
| 1257577 | 7/1961 | France | 181/220 |

*Primary Examiner*—Charles G. Freay
*Attorney, Agent, or Firm*—Robert H. Sproule

[57] ABSTRACT

A jet engine has a noise reduction system which reduces the boundary layer located on the outer surface of the nacelle. The noise reduction system includes a plurality of openings located in the outer surface of the nacelle which are in communication with a source of low pressure. The low pressure causes a reduction in the boundary layer at the openings so that resulting ambient air flow velocity near the nacelle surface is increased. This causes a reduction in the shearing between the secondary and ambient airflows thereby reducing the noise.

6 Claims, 4 Drawing Sheets

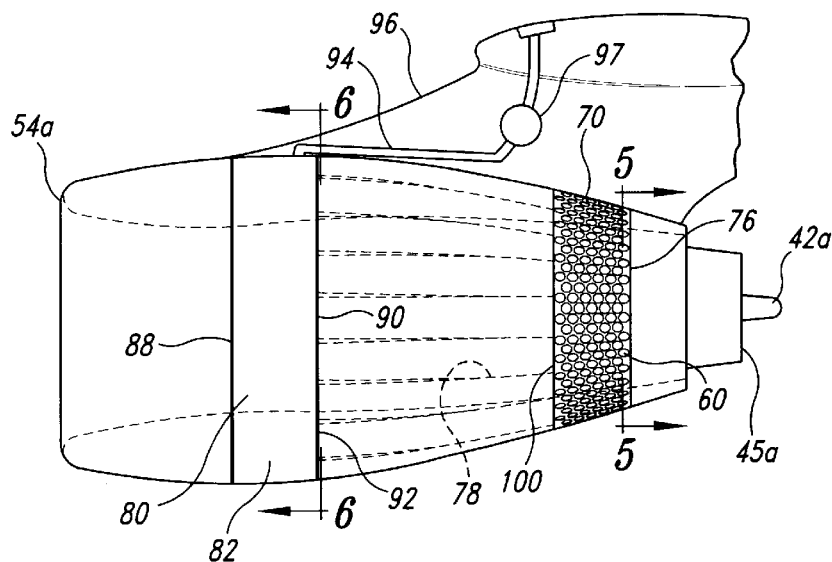
Fig. 4
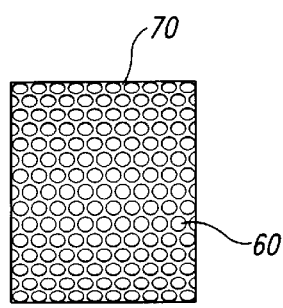
Fig. 6
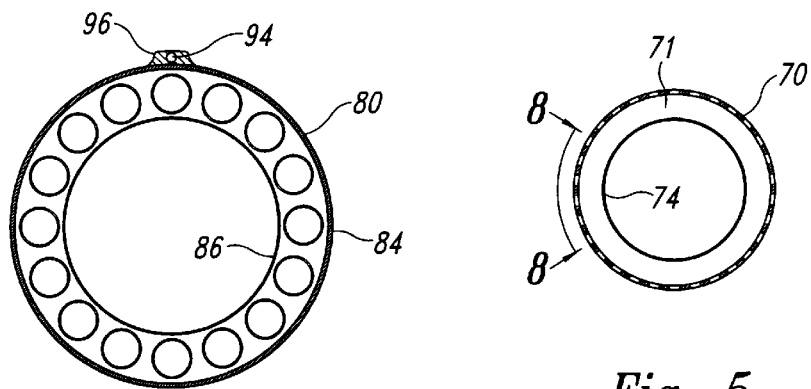
Fig. 5
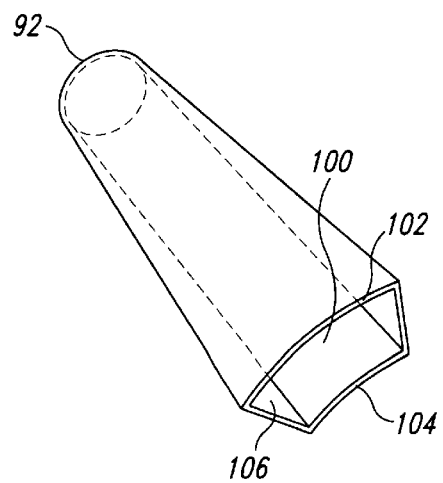
Fig. 8
Fig. 7

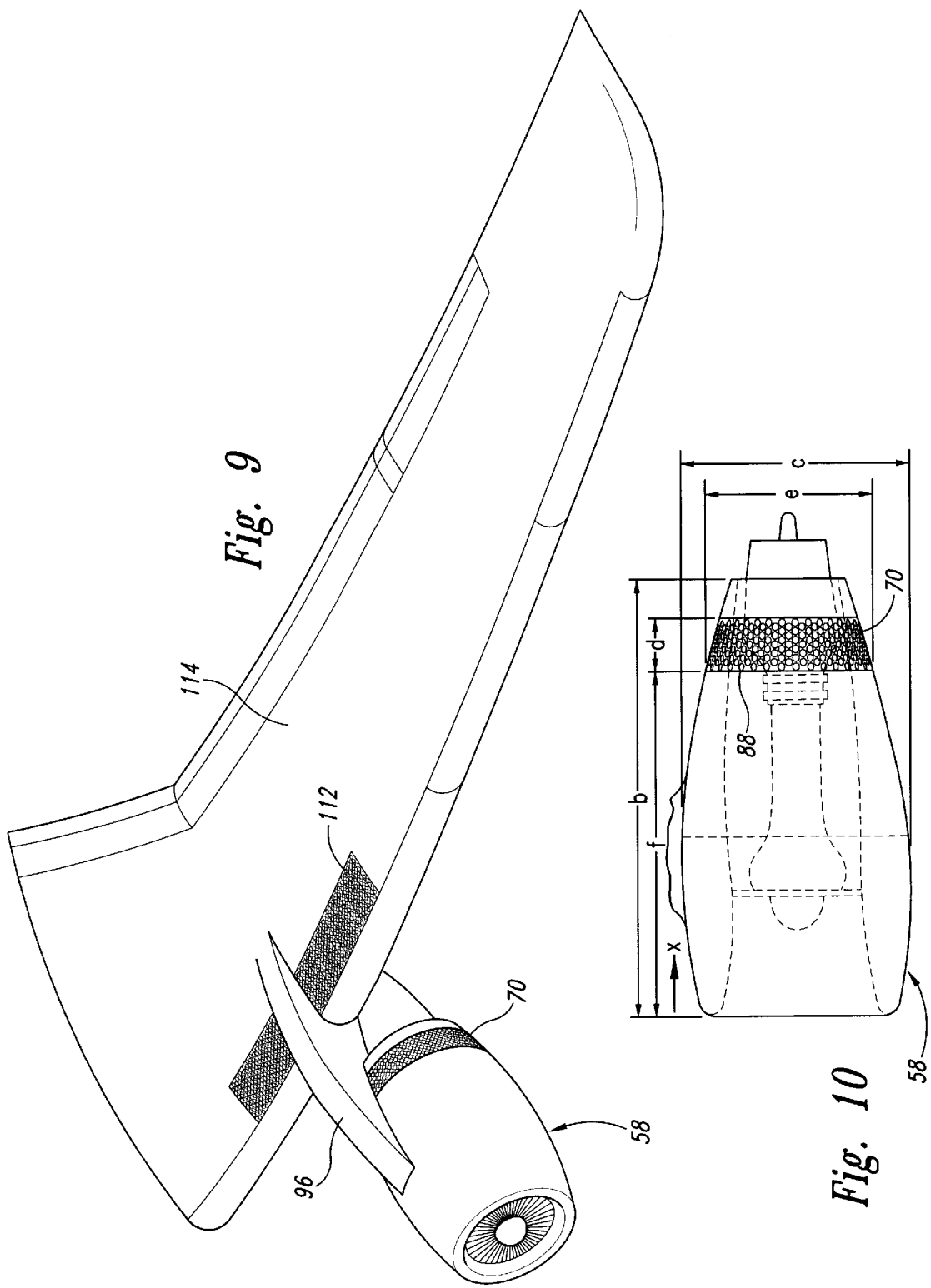

JET ENGINE AND METHOD FOR REDUCING JET ENGINE NOISE BY REDUCING NACELLE BOUNDARY LAYER THICKNESS

TECHNICAL FIELD

The present invention relates to an improved jet engine and methods for reducing the noise generated by a jet engine during flight, and more particularly to an improved jet engine and method for reducing jet engine noise by reducing the thickness of the airstream boundary layer which is present on the outer surface of the engine's nacelle.

BACKGROUND OF THE INVENTION

In response to public criticism, a number of national and international agencies as well as airplane manufacturers and engine manufacturers are in the process of establishing more stringent noise emission standards for new type aircraft. Some airports, such as London Heathrow, Washington National and John Wayne, limit aircraft traffic based on noise emissions to the surrounding communities.

Typically current airport noise rules limit the amount of jet engine noise which can be emitted during takeoff and during approach to landing. Engine noise produced during takeoff is usually the highest contributor because the engine is at its highest power setting. Noise generated by an airplane jet engine has many components including fan noise, combustion noise, airframe noise and jet noise. Jet noise is caused by the shearing of three different airflows— the airflow from the engine fan duct exhaust with the cooler ambient airflow and the airflow from the engine core exhaust and the engine fan duct exhaust. It is similar to the noise one commonly hears from a high pressure air hose. Jet noise is the most prevalent engine noise component at high engine thrust conditions.

Historically, engine noise suppression has been achieved most dramatically by increasing secondary-to-primary mass flow bypass ratios from values near one, such as engines on the Boeing 727 and 737-200, to values nearer to five and up to eight such as on the Boeing 757, 767 and 777. The term "bypass ratio" refers to the ratio of (i) the mass flow rate of air which bypasses the engine core and is directed along a fan duct located between the engine core and the nacelle, to (ii) the mass flow rate of air which travels through the engine core. It has been found that increasing the bypass ratio decreases peak jet velocities, shear layer velocity gradients and turbulence thereby resulting in lower noise emissions.

Other attempts to reduce engine noise have been directed to various types of "hush kits" such as free mixers (i.e. ejectors) and forced mixers. The hush kit is typically connected to the aft end of the engine. It uses multiple lobes or spokes to mix the high velocity hot streams from the engine with the cooler lower velocity free streams of the surrounding air. The resulting mixing decreases peak jet velocity and shifts the noise from low frequency to high frequency where it can be more efficiently absorbed during atmospheric propagation.

Many of the above approaches have been successful in reducing engine noise levels. However, further reduction in jet engine noise is needed. Newer, higher bypass engines have yet to be fully developed, whereas hush kits tend to add complexity and weight to an already complex engine system.

A number of other conventional engine noise reduction systems using suction devices have been disclosed. For example, U.S. Pat. No. 3,095,696 by Rumble discloses a jet engine having an internal space of reduced pressure which surrounds the length of the engine for reducing engine noise emissions. Furthermore, U.S. Pat. No. 3,371,743 by Chanaud et al discloses a jet engine having an internal suction source at the exhaust outlet for reducing engine noise emissions.

Other noise reductions systems using suction devices include U.S. Pat. No. 3,820,628 by Hanson which discloses a jet engine having guide vanes and flow splitters which have openings in communication with a suction source so as to remove the boundary layer and the resulting wakes.

U.S. Pat. No. 5,060,471 by Torkelson discloses a jet engine having porous acoustical lining wherein the pressure at opposite surfaces of the lining can be varied so as to control the direction of air flow through the acoustical lining thereby varying the sound attenuating characteristics of the lining.

Suction devices have also been used to reduce aerodynamic drag. For example, U.S. Pat. No. 5,297,765 by Hughes et al discloses an engine nacelle having a porous surface at the forward end of the nacelle such that the porous surface is in communication with a suction source in order to reduce drag associated with the nacelle. In addition, U.S. Pat. Nos. 4,296,899 and 4,171,785, both by Isenberg, and which are assigned to the assignee of the present invention, disclose an aerodynamic surface such as a wing having a plurality of slots through which boundary layer air can be drawn in order to maintain laminar flow and reduce drag.

Other suction devices for reducing drag include U.S. Pat. No. 5,368,258 by Johnson et al, which discloses an engine nacelle wherein gaps in the skin of the nacelle are in communication with a suction source so as to reduce drag caused by the gaps. And, U.S. Pat. No. 4,993,663 by Lahti discloses an engine nacelle which incorporates a suction bleed system at the forward portion of the nacelle to promote laminar flow and reduce drag.

Furthermore, U.S. Pat. No. 4,258,889 by Hunt, which is assigned to the assignee of the present invention, discloses an insert for a suction slot in a wing to maintain laminar flow.

SUMMARY OF THE INVENTION

The present invention pertains to an improved jet engine which includes a nacelle having a forward end, and a rearward end. The nacelle is located in an airstream such that a free airstream flow in contact with the nacelle creates a boundary layer at the outer surface of the nacelle. There is also an engine, having a fan portion and a core portion, which is located inside the nacelle and which discharges air at an outlet in a manner to generate noise.

Also included is a suction surface having a plurality of openings and located in the outer surface of the nacelle at a location near the rearward end of the nacelle such that the openings are in communication with the boundary layer. In addition, there are means, in communication with the openings, for reducing the pressure at the openings so that the boundary layer located rearward of the openings is smaller than the boundary layer located forward of the openings thereby reducing the noise from the discharged air.

It is an object of the present invention to reduce the noise from a jet engine.

It is another object to reduce the airstream boundary layer on the outer surface of the engine's nacelle for the purpose of reducing noise.

BRIEF DESCRIPTION OF THE DRAWINGS

These and other objects and advantages of the present invention will be described in greater detail in the following Detailed Description in conjunction with the attached drawings, in which:

FIG. 4 is a side view of the improved airplane engine which incorporates a noise reduction system;

FIG. 5 is a front sectional view of the improved jet engine taken along line 5—5 of FIG. 4;

FIG. 6 is a front sectional view of the improved jet engine taken along line 6—6 of FIG. 4;

FIG. 7 is a perspective view of a portion of a pipe used in the noise reduction system;

FIG. 8 is a side view of a portion of the engine nacelle taken along line 8—8 of FIG. 5;

FIG. 9 is a perspective view of an airplane wing showing an exemplary suction device used in the present invention; and, FIG. 10 is a side view of the nacelle of the improved jet engine.

DETAILED DESCRIPTION

Figure 1:
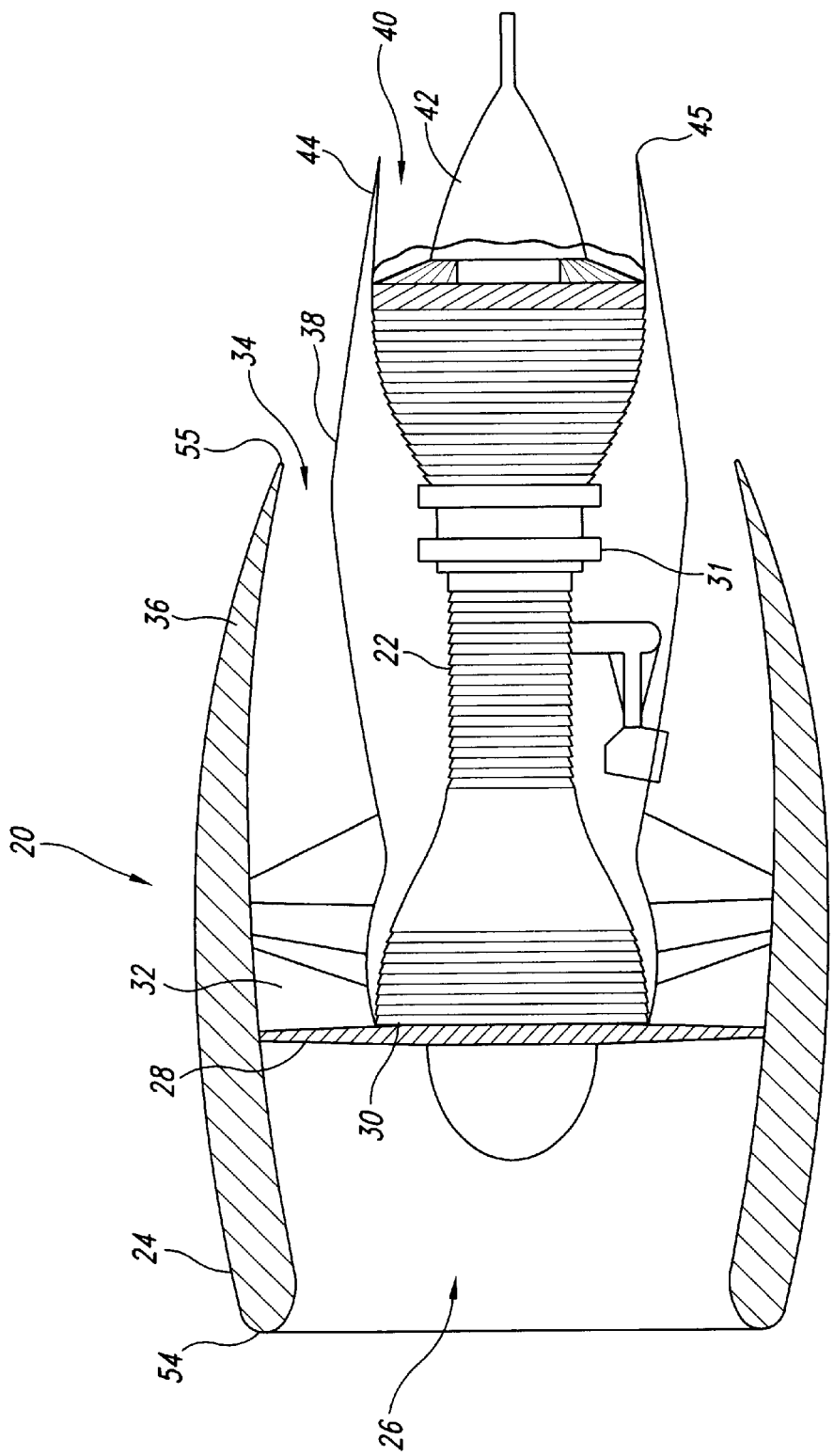
FIG. 1 is a side section view of a conventional separate flow jet engine.

Referring to FIG. 1 there is shown a conventional separate flow jet engine indicated at 20 which includes a centrally mounted gas turbine engine 22. At a forward end of the engine 20 is a fan cowl 24 which includes an inlet duct 26. Air entering the inlet duct 26 is propelled rearward by a rotating fan blade 28. Some of this air enters the core of the engine through an inlet 30 into a compressor section of the engine where it is compressed and eventually heated by a downstream burner section 31. The majority of the air, however, is fed through a fan duct 32 where it exits the engine at a fan duct outlet 34 which is formed by an outer cowl 36 and the engine core case 38. The air exiting the fan section is also known as "secondary flow". The hot air exiting from the burner section (known as "primary flow") is discharged from the aft end of the core through an exhaust duct 40 which, in this example, is located downstream of the fan duct outlet 34. Forming the engine exhaust duct 40 is an exhaust plug 42 and the inner surface of the exhaust nozzle 44 which terminates at an aft end 45.

Jet noise is generated in the turbulent mixing region behind the engine where high velocity exhaust gases from the fan duct and from the engine core mix with ambient air. The difference in velocities between these two airstreams and the ambient air result in shearing between the flows with each producing a portion of the noise. This noise is broad band in nature with the acoustic energy distributed broadly over the frequency spectrum. Jet noise is generally categorized by noise which is generated by turbulence as well as by the interaction of turbulence and mean shear flow caused by the velocity gradients between the coaxial flows (i) from the engine core and from the fan duct and (ii) from the fan duct and the ambient air. In high bypass engines total jet noise is a combination of three sub-components. In order of importance they are mixed jet noise, secondary jet noise, and primary jet noise.

Figure 2:
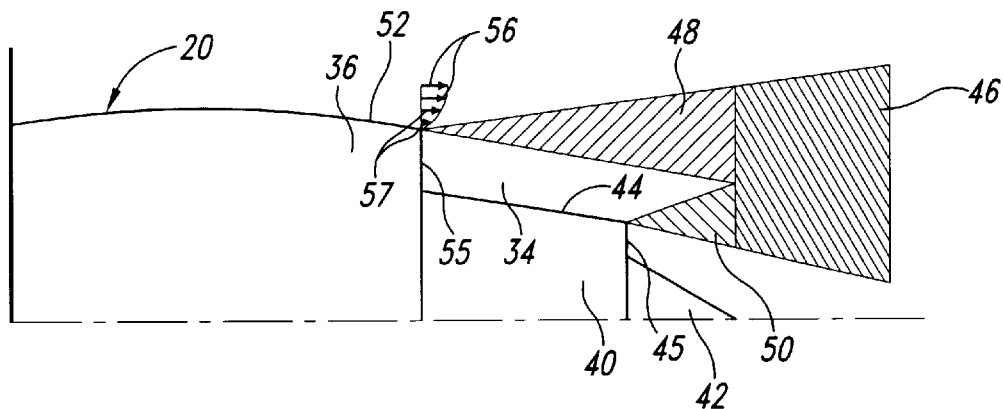
FIG. 2 is a schematic diagram of the shear layers resulting from the primary and second flows from a conventional separate flow airplane jet engine.

As shown in FIG. 2, in a conventional engine the mixed jet noise is created in a region identified by the number 46 where the secondary and primary shear layers mix and the resulting mixture shears the ambient flow. The secondary jet noise is generated in a region identified by the number 48 where the exhaust from the fan duct shears ambient air flow. The primary jet noise is created in a region identified by the number 50 where the exhaust from the engine core shears the flow from the fan duct. Reduction of jet noise can be accomplished by properly modifying these shearing and mixing processes.

As further shown in FIG. 2, there is a boundary layer which defines the airstream, between (i) the exterior surface of the engine nacelle identified by the number 52 and (ii) the location where the airstream reaches free stream velocity as shown by an arrow identified by the number 56. The exterior skin of the engine is often referred to as the "nacelle" and it has a forward end 54 (FIG. 1) and a rearward end 55. During takeoff, on a typical engine nacelle near the fan duct exhaust, this boundary layer is on the order of one or two inches thick.

Shearing at region 48 between the ambient air flow shown by arrows identified by the number 56 and the secondary flow is a result of the differential in velocities between the two flows. The greatest velocity differential is at the boundary layer shown by arrows identified by the number 57 where airstream velocities approach zero. Therefore, a major contributor to the shearing between the secondary flow (from the fan duct) and the free stream flow is in the boundary layer which exists along the outside surface of the engine nacelle.

Figure 3:
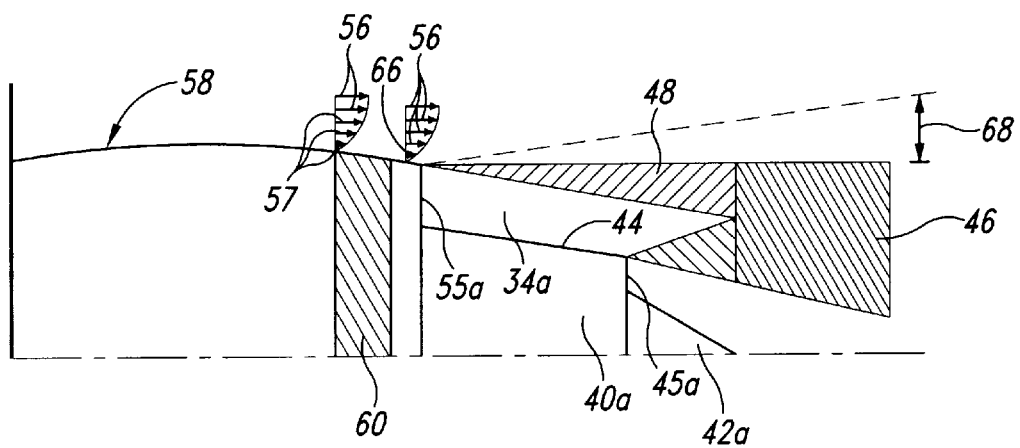
FIG. 3 is a schematic diagram of the shear layers resulting from the primary and second flows from the improved airplane jet engine of the present invention.

Turning now to the present invention, there is shown in FIG. 3 an exemplary separate flow jet engine indicated at 58 where like elements described previously are identified by like numerals with the suffix "a" attached. It should be appreciated that although the previous discussion of conventional jet engines as well as the present discussion of the improved jet engine are directed toward separate flow engines, the present invention may be applied to many different types of jet engines including confluent flow engines where the exhaust plug and primary nozzle may be located upstream of the aft end of the nacelle.

In the present invention located near the aft end of the nacelle are a band of openings identified by the number 60 which extend through the skin of the nacelle and which are connected to a suction device (not shown). In a first exemplary embodiment the suction device is the auxiliary power unit (APU) which is already present on the airplane. In a second exemplary embodiment the suction device is a separately installed conventional vacuum pump. The purpose of the suction device is to create a low pressure area at the surface of the nacelle at the openings 60. The purpose of the low pressure area is to reduce and preferably eliminate the nacelle boundary layer.

Although not wishing to be found by theory, it is believed the present invention achieves a reduction in jet noise in the following manner. As shown in FIG. 3, the boundary layer 57 at the suction openings 60 is eliminated; however, a new boundary layer shown by arrows identified by the number 66 begins forming downstream of the suction openings 60. By the time this boundary layer 66 reaches the nacelle aft end 55a, and prior to it mixing with the secondary flow, it is much thinner in depth as compared to the boundary layer 57 in FIG. 2.

This reduction in the boundary layer thickness causes a reduction in the thickness of the secondary flow shear layer 48 and mixed flow shear layer 46. The amount of this reduction is identified by the number 68 in FIG. 3 and it represents the difference in the width of the shear layer resulting from (i) a jet engine which does not use the present invention (FIG. 2) and (ii) a jet engine which uses the present invention (FIG. 3). Because the thicknesses of the secondary shear layer 48 and mixed shear layer 46 have been reduced, this causes a reduction in jet noise level.

Thus, boundary layer bleed reduces engine jet noise by reducing boundary layer thickness on the outside of the nacelle prior to ambient air mixing with the fan duct exhaust. Jet noise is reduced because of thinner shear layers, smaller velocity gradient and lower turbulence between the fan duct exhaust flow and the ambient flow. This affects the downstream noise generation source of the mixed jet noise region as well.

In another exemplary embodiment, reference is made to FIG. 4 which shows the suction openings 60 which form a band 70 about the circumference of the nacelle. It is desirable to locate the suction band 70 as close to the aft end 55a (FIG. 3) of the nacelle as is possible so as to minimize the boundary layer 66 at the aft end of the engine. Inside the suction band 70 there is an annular chamber 71 (FIGS. 5 and 8) having an outer cylindrical wall which contains the openings 60, an inner cylindrical solid wall 74, and an annular plate 76 (FIG. 4) which encloses the downstream end of the chamber 71.

In order to connect the chamber 71 with the suction device, a number of pipes 78 (FIGS. 4 & 6) extend between the downstream suction chamber 71 and an upstream manifold 80. The manifold 80 includes an annular chamber 82 which has a cylindrical outer wall 84, an cylindrical inner wall 86, a circular end wall 88 which encloses the upstream side of the chamber and a circular end wall 90 which encloses the downstream end of the chamber. The downstream wall 90 includes a number of cylindrical openings through which the upstream ends 92 (FIG. 7) of the pipes 78 extend. In addition, a large duct 94 (FIG. 4), connected to an opening in the upper surface of the chamber 82, extends through the wing-to-nacelle strut 96 and is connected to the suction device which is located in another part of the airplane as discussed previously. Also located in the duct 94 is a valve 97 which operates such that the suction device is in communication with the suction openings 60 only during takeoff and landing.

As shown more clearly in FIG. 7, each pipe 78 includes the upstream end 92 which has a circular cross section, and which tapers into a downstream end 100 which has a cross section formed by an outer convex edge 102, an opposing inner concave edge 104, and generally vertical side walls 106. The totality of outer convex edges 102 form a continuous outer ring which is adjacent to the upstream end of the suction chamber 71 below the outer surface of the nacelle, and the totality of the inner concave edges 104 form a continuous inner ring which is adjacent to the upstream end of the suction band 70 near the inner wall 74 of suction chamber 71.

In another exemplary embodiment shown in FIG. 9, the suction device is a plurality of openings 112 located in the upper surface of a wing 114 behind the fixed leading edge. The openings 112 which occupy a rectangular band are in communication with the duct 94 (FIG. 4). The low pressure on the upper surface of the wing during flight provides the source of suction for bleeding off the nacelle boundary layer.

In order to calculate the number and size of suction openings 60, reference is made to FIG. 10 which shows the jet engine 58 which has a total lengthwise axial dimension "b" of 10 feet, a maximum diameter "c" of 4.5 feet, a lengthwise dimension "d" of the suction band 70 of one foot, a diameter "e" of the suction band 70 of 3 feet, and a lengthwise dimension "f" between the forward end of the engine and upstream end wall 88 of the suction band 70 of 8.5 feet.

For a typical takeoff condition, it is estimated that removal of the boundary layer requires approximately 14.3 lbm/sec of air through the suction band 70. This is calculated based on a flat plate turbulent boundary layer theory and takeoff conditions involving an airplane Mach number of M=0.23 and an outside air temperature=75° F. Assuming the boundary layer begins at a point "x" on FIG. 10 which is two feet from the upstream end of the nacelle, using conventional calculations the boundary layer at the upstream end wall 88 of the suction band 70 is 1.1 inches thick.

In order to maintain the boundary layer bleed circumferentially uniform, there should be a least a 1.0 psi pressure drop across the entire suction band 70. In the present embodiment, the band 70 is part of the nacelle skin having a thickness of 0.033 inches. Using openings 60 having diameters of 0.0625 inches, the resulting mass flow rate through each opening 60 should be approximately (4.5) $(10^{-4}$ lbm/sec). The number of openings 60 which are required in the suction band 70 is (14.3 lbm/sec)/(4.5) $(10^{-4}$ lbm/sec/opening)=31,778 openings in the suction band 70.

The number and diameter of manifold tubes 78 (FIG. 4) required for the boundary layer suction system is a function of the requirements for reasonable flow velocities to minimize pressure losses (i.e., 200 ft/sec). This would require the suction duct 94 to have a diameter of about 13.5 inches. On the assumption there are twenty suction pipes 78, it is calculated that each suction pipe 78 would have a diameter of about three inches.

What is claimed is:

1. A jet engine comprising:
   a. a nacelle having a forward end, and a rearward end, and which is located in an airstream such that a free airstream flow which is in contact with the nacelle creates a boundary layer at the outer surface of the nacelle;
   b. an engine, having a fan portion and a core portion, located inside the nacelle and discharging air at an outlet in a manner to generate noise;
   c. a suction surface having a plurality of openings and located in the outer surface of the nacelle at a location near the rearward end of the nacelle such that the openings are in communication with the boundary layer; and
   d. means, in communication with the openings, for reducing the pressure at the openings so that the boundary layer located rearward of the openings is smaller than the boundary layer located forward of the openings thereby reducing the noise from the discharged air.

2. The jet engine as set forth in claim 1 wherein:
   a. the core portion discharges a primary flow of air; and
   b. the fan portion discharges a secondary flow of air such that the combination of the primary flow discharge, the secondary flow discharge and free stream flow generates the noise.

3. The jet engine as set forth in claim 2 wherein:
   a. the fan portion discharges the secondary flow of air such that (i) a mixture of the free stream flow and the secondary flow produces secondary jet noise and (ii) a mixture of the secondary flow and the primary flow produces primary jet noise, and (iii) a mixture of the primary flow and the secondary flow with the free stream flow produces mixed jet noise; and b. the pressure reducing means operates in a manner to reduce the boundary layer thickness on the outside of the nacelle prior to the secondary flow mixing with the free stream flow so as to reduce the secondary and mixed jet noise.

4. The jet engine as set forth in claim 1 wherein the pressure reducing means includes a pump and a conduit which connects the pump with the openings.

5. The jet engine as set forth in claim 4 wherein the pressure reducing means includes an annular chamber in communication with the conduit.

6. A method of reducing noise from a jet engine, the method compromising:

a. locating a nacelle in an airstream such that a free airstream flow in contact with the nacelle creates a boundary layer at the outer surface of the nacelle;

b. discharging a primary flow of air from a core portion of the engine;

c. discharging a secondary flow of air from a fan portion of the engine such that a combination of the primary flow discharge, the secondary flow discharge and the free airstream flow produces noise;

d. providing a suction surface having a plurality of openings which are located in the outer surface of the nacelle at a location near the rearward end of the nacelle such that the openings are in communication with the boundary layer; and e. reducing the pressure at the openings so that the boundary layer located rearward of the openings is smaller than the boundary layer located forward of the openings to reduce the boundary layer thickness on the outside of the nacelle prior to the secondary flow mixing with the free stream flow so as to reduce the noise.

* * * * *